United States Patent
Wong et al.

(10) Patent No.: US 10,176,270 B2
(45) Date of Patent: Jan. 8, 2019

(54) PERFORMANCE OF TEMPLATE BASED JAVASCRIPT WIDGETS

(75) Inventors: Cesar Augusto Wong, Cary, NC (US); Morgan Louis Johnson, Durham, NC (US); Marc Dreyfus, Brooklyn, NY (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 1443 days.

(21) Appl. No.: 12/647,142

(22) Filed: Dec. 24, 2009

(65) Prior Publication Data

US 2011/0161840 A1 Jun. 30, 2011

(51) Int. Cl.
*G06F 3/048* (2013.01)
*G06F 17/30* (2006.01)
*G06F 8/35* (2018.01)
*G06F 8/38* (2018.01)

(52) U.S. Cl.
CPC .......... *G06F 17/30893* (2013.01); *G06F 8/35* (2013.01); *G06F 8/38* (2013.01)

(58) Field of Classification Search
CPC ........ G06F 17/30893; G06F 8/35; G06F 8/38; G06F 17/30917; G06F 17/3089; G06F 17/30905; G06F 3/048; G06K 9/6203
USPC ....................................................... 715/235
See application file for complete search history.

(56) References Cited

U.S. PATENT DOCUMENTS

| | | | |
|---|---|---|---|
| 5,973,696 A | 10/1999 | Agranat et al. | |
| 6,480,882 B1 * | 11/2002 | McAdam et al. | 709/202 |
| 7,013,340 B1 | 3/2006 | Burd et al. | |
| 7,047,318 B1 | 5/2006 | Svedloff | |
| 7,321,918 B2 | 1/2008 | Burd et al. | |
| 2003/0140045 A1 * | 7/2003 | Heninger et al. | 707/10 |
| 2004/0143823 A1 | 7/2004 | Wei | |
| 2006/0206589 A1 | 9/2006 | Lentini et al. | |
| 2007/0061700 A1 * | 3/2007 | Kothari et al. | 715/505 |
| 2007/0300150 A1 * | 12/2007 | Davis | 715/513 |
| 2008/0046872 A1 | 2/2008 | Cooper | |
| 2010/0185930 A1 * | 7/2010 | Scott et al. | 715/222 |

FOREIGN PATENT DOCUMENTS

CN 101258481 A 9/2008

OTHER PUBLICATIONS

Michael Hanus; Putting Declarative Programming into the Web: Translating Curry to JavaScript*; Institutfur Informatik, CAUKiel, Kiel, Germany; Jul. 14-16, 2007, pp. 155-166.
International Search Report and Written Opinion PCT Application, PCT/EP201/067968, dated May 30, 2012.
http://www.dojotoolkit.org/coyote-point-systems—saved Dec. 4, 2009.

(Continued)

*Primary Examiner* — Namitha Pillai
(74) *Attorney, Agent, or Firm* — North Shore Patents, P.C.; Michele Liu Baillie

(57) ABSTRACT

Included are method, article of manufacture, and device that serve to embed a universal script object into programming code used for rendering a web page, convert the universal script object into JavaScript, and upon receiving a request for a web page, send the converted and embedded universal script object towards a requestor. The universal script object may be converted from HTML or some other language.

3 Claims, 4 Drawing Sheets

(56) References Cited

OTHER PUBLICATIONS

Hanus, Michael, Type-Oriented Construction of Wb User Interfaces, Extended Abstract, Institut fur Informatik, CAU Kiel, D-24098 Kiel, Germany, 2006.
Office Action dated Jul. 2, 2014 in Chinese Patent Application 20100058679.x.
Examination Report Under Section 18(3) UK IPO dated Feb. 2, 2017 for Application GB1208758.1.
Examination Report Under Section 18(3) UK IPO dated May 12, 2017 for Application GB1208758.1.

* cited by examiner

PERFORMANCE OF TEMPLATE BASED JAVASCRIPT WIDGETS

BACKGROUND

The field of invention involves client based universal script object interpretation and rendering. More specifically, embodiments are directed to interpreting or converting string representations taken from a cross-platform universal script object template library and embedding the string representations into code ahead of parsing or running the code for display by a client application.

Generally speaking, Web designers may use prewritten templates and language in order to expedite the time and effort needed to develop complex websites. The prewritten templates serve to reduce the amount of custom coding needed for a particular web application. Prewritten templates and language can be found in libraries remote from a programmer's location. When needed, this language may be inserted directly into the code being written by the programmer in order to expedite the programming process. The prewritten code available at the library can include User Interface (UIs) items such as buttons and drop-down menus, organization charts, grids, and other items that are usually and normally found on Web pages.

When the code is written using the prewritten templates, HTML code may be inserted into the code. Prior to the code being used at run-time, the HTML code is parsed by the client application. Then, upon being parsed, both the code written by the programmer and the HTML code inserted from the library may be run by the client application. Thus, when web applications are written with the use of code libraries, the client application is burdened with parsing HTML code from the library during run-time in order to properly render the Webpage.

In a specific instance, when Web application designers use the template framework DOJO to build dynamically created JavaScript-based UIs, they, in effect, expedite the time to develop complex websites by reducing the amount of custom coding. A trade-off is slow performance of the code at run-time. Specifically, performance suffers at the client machine because each of the user interface elements, commonly known as widgets, include a DHTML template that must be parsed by the client machine at run-time. The more widgets on the page, the more processing needed to interpret the code.

BRIEF SUMMARY

As described herein, the invention may be embodied in various forms, including systems, devices, methods, and articles of manufacture. The embodiments provided herein are illustrative and not limiting, and may be adapted in-part or combined, all while staying within the spirit and scope of the invention.

In embodiments, universal script objects from a library may be combined with non-library code prior to the code and object being executed by a client. The universal script object may be processed or interpreted ahead of the parsing of the code, in which it was inserted, at run-time. Because of this processing or interpretation, the inserted object need not be parsed separately from the code in which it is embedded when the code is executed at run-time by a client.

The embodiments can include network devices, systems, methods, and computer readable medium. Each may include instructions for microprocessors, that when executed by the microprocessor, cause the microprocessor to process or interpret the universal script object ahead of a client executing the final code to be run. In embodiments, the instructions to interpret or convert the embedded code from the library may be run at a server or elsewhere, prior to the client parsing the final code at run-time.

DETAILED DESCRIPTION

Various embodiments of interpreting and rendering universal script objects are provided herein. The invention may be reflected in these embodiments, portions of these embodiments, combinations of these embodiments, and other embodiments as well.

The universal script objects may be stored and retrieved from code libraries accessible over a network. The universal script objects may represent preconfigured drop-ins that are regularly used by programmers of Web pages. These include User Interfaces, drop down menus, site maps, grids, and other regularly repeatable Web images.

When coding, a programmer may insert these universal script objects into the code to decrease the time needed for programming and to increase the accuracy of the code being written, as the universal script objects may have already been reviewed for accuracy and completeness.

Embodiments include processing the universal script objects before the final code is parsed and run by the client. This processing may include converting or interpreting the universal script object embedded in the code to be run by the client into a form that can be executed by the client without additional processing when compared with the surrounding code being run by the client. In other words, if the client needs to parse and run JavaScript, for the majority of the code being rendered, the universal script objects would also be translated, parsed and run using JavaScript. The universal script object processing may be conducted by the Web server or elsewhere, and the results of the processing stored by Web server or elsewhere for immediate use or for subsequent use of the code to be run. The processing may serve to shorten the time necessary to parse and run the code at the client as well as to render any Web page reflected by the code at the client.

In embodiments, JavaScript-based UIs may be processed prior to final run-time at a client. A server sending the Web page, including the UIs templates, to the client may send them in a form that need not be parsed prior to run-time. In some embodiments, the client may process Web page and UI templates upon receipt, but prior to parsing and run-time of the Web page. In each event, the UIs would not need to be converted to JavaScript by the client at run-time. An advantage of this methodology can include higher performance experienced by the client at run-time. For example, when a large number of UIs or other universal script objects are involved, the increase in run-time performance can be on the order of 30%-50% improvement. This range of improvement, however, is not needed to fall within the spirit and scope of the invention.

Figure 1:
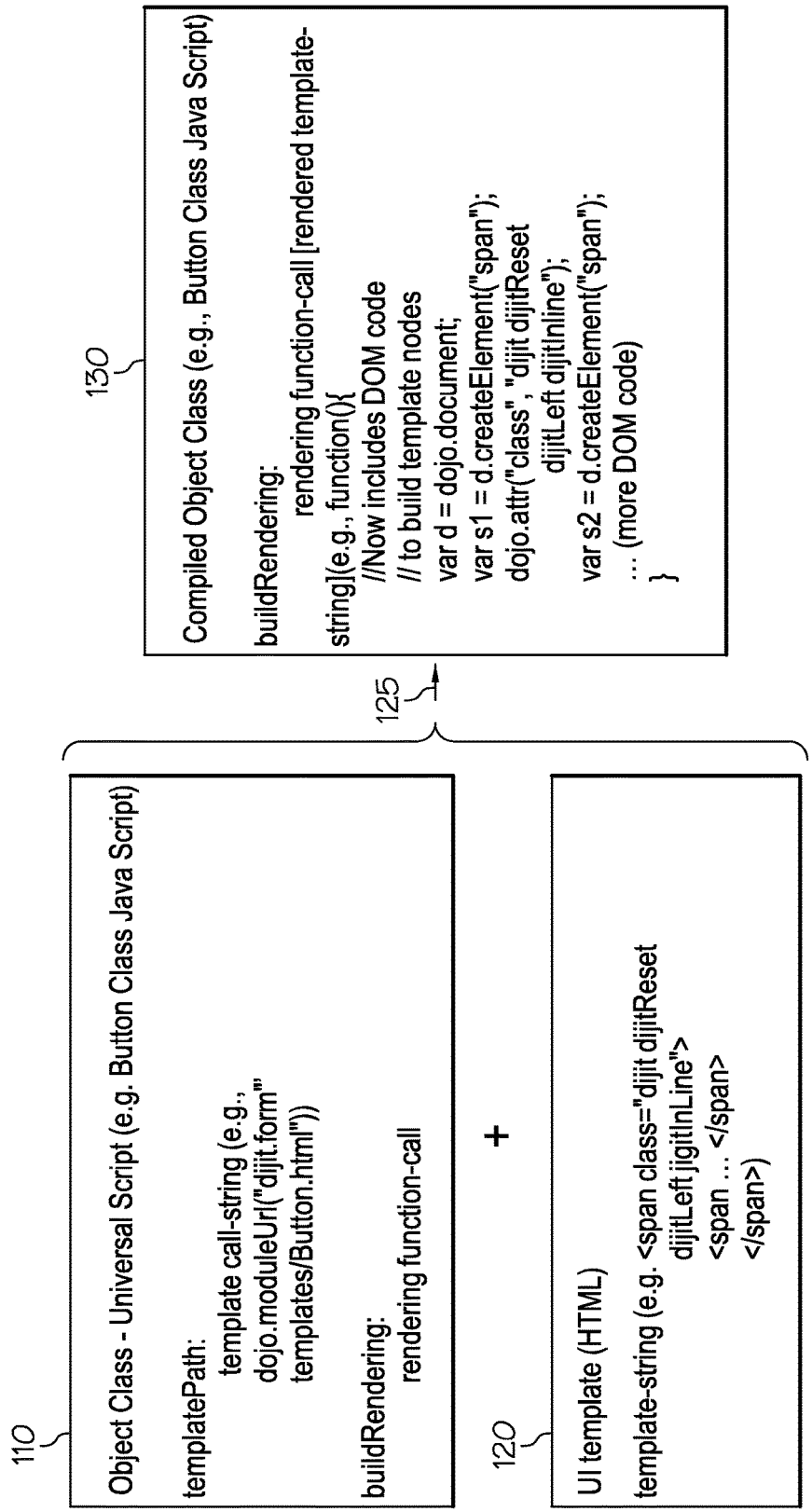
FIG. 1 is a block diagram that shows programming code and a universal script object prior to and after processing in accord with embodiments.

FIG. 1 is a modular block diagram showing programming code and universal script objects prior to and after being combined with embodiments of the invention. The programming code is shown in block 110, universal script object is shown in block 120, and the combined programming code 110 and universal script object 120 is shown in block 130. As can be seen in FIG. 1, the programming code may be combined with the universal script object 120 and then processed or converted into executable form as shown in block 130.

The program code in block 110 shows an object class universal script object being written by a programmer for a specific Web application. The code being written includes a template path and rendering to execute the template path as part of the programming. The universal script object 120 may be inserted into the programming code during the programming being completed by the programmer. The UI template, which may be written in HTML, may include template string direct creation of a button or some other user interface. This template string need not be written by the programmer but, rather, may be taken from the universal script object library. In this embodiment, block 130 represents not only the combination of the programming code 110 and the universal script object 120, but also the processed or converted object class as may be reflected in a client application prior to runtime. The arrow 125 reflects that the universal script object 120 may be packaged or embedded within the programming code 110 prior to being considered with the combined universal script object 130.

As can be seen, the processed or converted object class 130 in this example, a button class written in JavaScript, may include both the rendering and its associated rendering function call, as well as other code. In embodiments, the rendering function call, after being converted or processed at the client or the server, but prior to run-time, may include not only the UI template string but that string processed or converted in a manner such that it may easily executed by the client at runtime.

Figure 2:
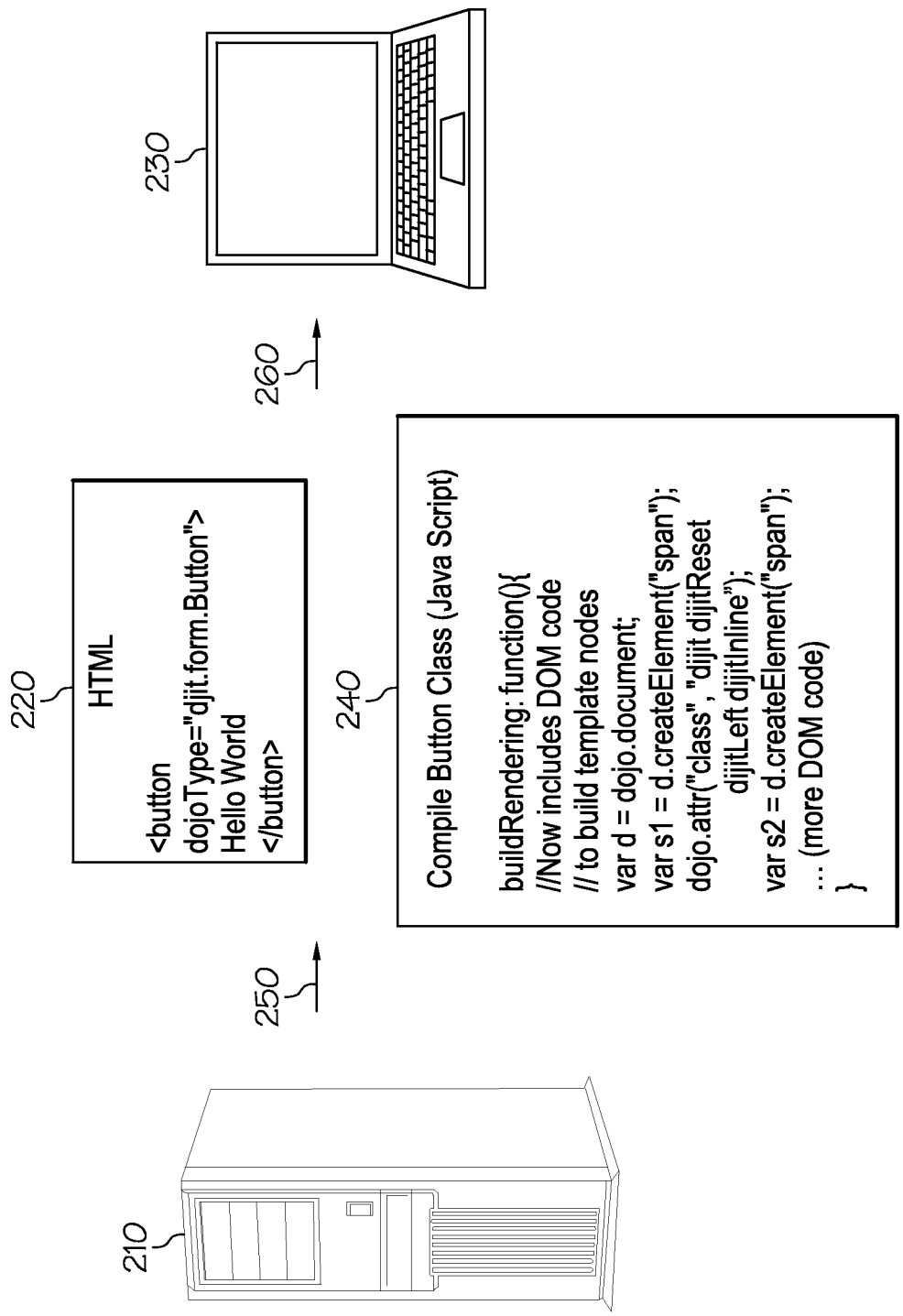
FIG. 2 is a block diagram that shows the flow of exemplary code between a server and client computer in accord with embodiments.

FIG. 2 shows a server 210, a client 230, HTML code 220, and a compile button class code 240. The template HTML and the Compile Button Class 240 may be packaged together and then interpreted prior to being run at the client 230. This packaging and interpretation may be completed at the server 210, or elsewhere, and is best completed prior to the client executing and running the combined code. If the interpretation and processing is conducted by the client, the client may store the information such that subsequent parsings at run-time of the Webpage using the compiled button class and JavaScript need not be interpreted or processed. As can be seen in FIG. 2, the compile button class may include a rendering function directed to the DOM code.

Figure 3:
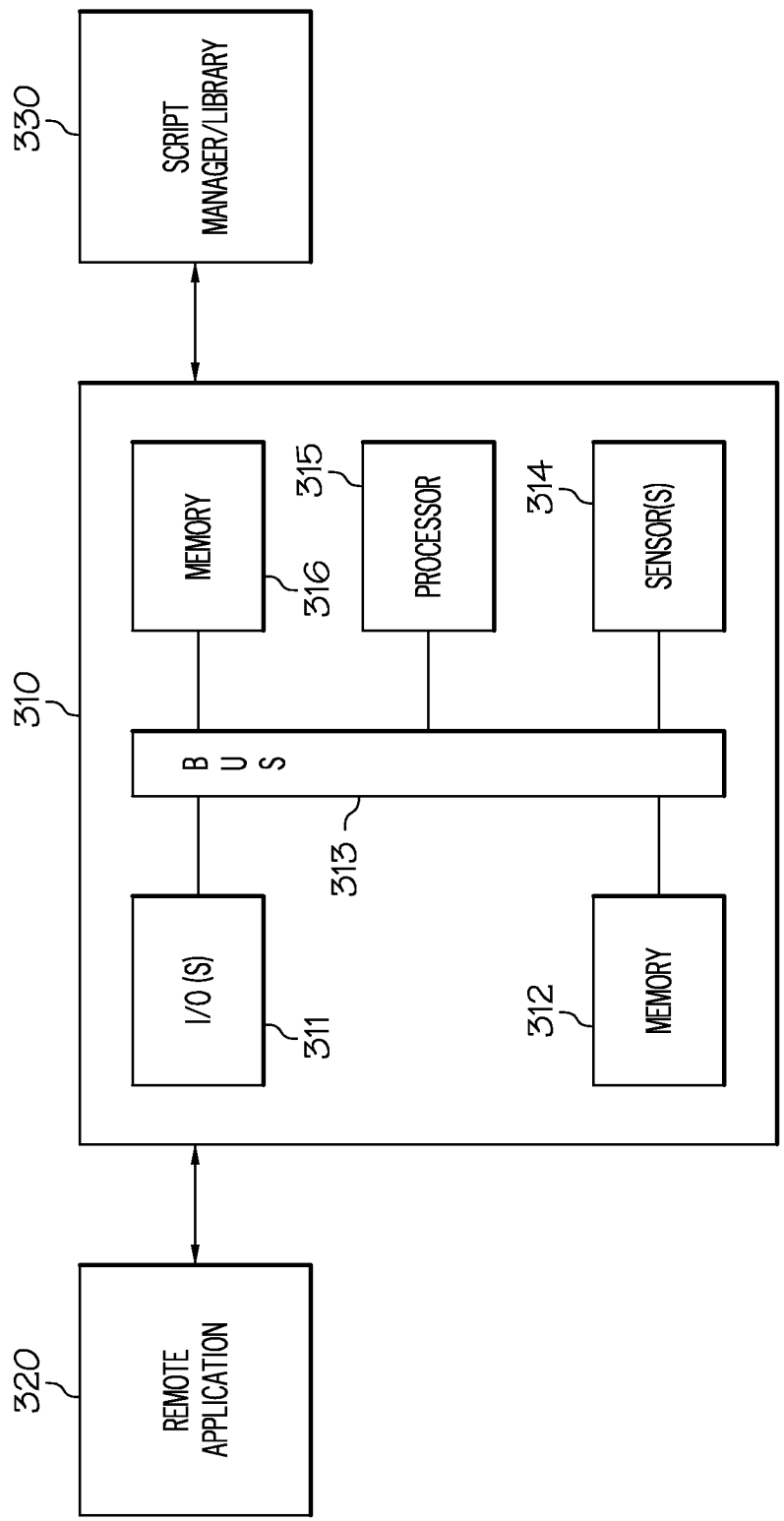
FIG. 3 is a block diagram of a microprocessor coupled to a remote application and script library in accord with embodiments.

FIG. 3 shows a microprocessor 310 in communication with remote application 320 and a script manager library 330. The microprocessor 310 may contain input/outputs 311, memory 312, memory 316, processor 315, and sensors 314. The microprocessor 310 may receive universal script objects from the script manager library 330 and may receive Web applications for the remote application 320. Microprocessor 310 may combine, render, and execute these files in embodiments. The microprocessor 310 may be resident in a client application, server application, and in other devices as well. Instructions to be stored in a memory 316 of the microprocessor 310 may be input into the memory through input outputs 311 from transportable storage media as well as through other methods. As described throughout, the microprocessor may conduct the interpretation or processing of the HTML code of a widget into JavaScript that may be run by a client at run-time, thereby reducing the burden and overhead associated with executing the UI widget.

Figure 4:
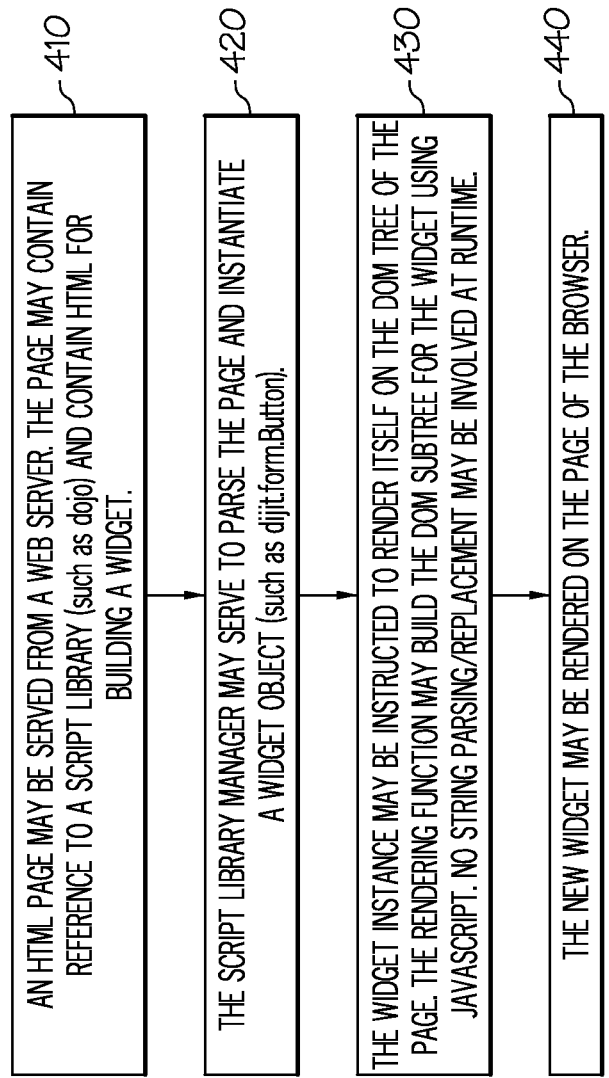
FIG. 4 is a block diagram of an exemplary method that embodies the invention.

FIG. 4 shows a method in accordance embodiments. As can be seen at 410 an HTML page may be served, wherein the Web server for the page may contain reference to script libraries such as dojo, Yahoo, or Google, and may contain HTML for building a widget. 420 shows that in embodiments the script library manager may serve to insert code for the page and instantiate a widget object such as digit.form.button. Next, 430 shows that the widget instance may be used to render itself on the DOM tree of the page. The rendering function may build the DOM subtree for the widget using JavaScript. Other building protocols may be used as well. In either event, little or no string parsing and replacement may be involved at the client during run-time. Finally, at 440, a new widget or other universal script object user interface may be rendered on the page of the browser at the client run-time. Here, the UI widget may be parsed at run-time consistent with the other code being parsed by the client when rendering the Web page.

In embodiments, further to the above, the processing of JavaScript associated with the user interface elements downloaded from a server may be generated using HTML code for the user interface element and for the rendering at the client location. This generated HTML code, may be stored at the client and/or storage impositions accessible to the client such that runtime by the client improve performance and rendering of the Web page may be accomplished. In embodiments, the methods may include preprocessing of templates for elements of user interfaces and embedding the user interface elements into code form for dynamically created JavaScript-based user interfaces. At compile time, rather than just copying the HTML template to a string in the compiled class, the HTML template may be converted into JavaScript code that builds the DOM nodes of the template. In other words the HTML template for the universal script object isn't simply just copied, rather it is converted into runable code for use on the DOM node of the template.

At run-time, an HTML page may be served from a Web server. This page may refer to a dojo script library and may contain HTML to build a button widget. Dojo may evaluate the page and, based on a dojo type attribute of the button tag, dojo may instantiate a widget object, e.g., of the type digit.form.Button. This button instance may be alarmed or instructed to render itself on the DOM tree of the page. The rendering function may build the DOM subtree for the widget using Java and JavaScript. In so doing, little or no string parsing may be involved in run-time at the client. Finally, the new widget may be rendered on the page of the browser.

The dojo rendering completed in embodiments may be undertaken at the server or the client depending on network capabilities and load conditions. When conducted at the client, the client may retain or save the DOM tree structure as well as other information for subsequent renderings of the browser page. Other information may also be stored as is needed at the client for client interpretation, client parsing, and client rendering. As noted, examples of widget toolkits other than dojo include Yahoo! UI widget toolkit, and Google widget toolkit.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. A method of converting code to render a web page prior to run-time at a client, implemented by a server, the method comprising:
   receiving, by the server, programming code in JavaScript for rendering the webpage;
   receiving, by the server, a script object template for a user interface item from a universal script object library, the script object template comprising HTML code configured to render the user interface item;
   embedding, by the server, the HTML code of the script object template into the programming code to form a combined code;
   converting, by the server, the combined code into a compiled object class in JavaScript, the converting comprising: converting the entire HTML code in the combined code into a rendering function, wherein the rendering function comprises JavaScript code configured to build a Document Object Model node for the user interface item during run-time at the client; and
   upon receiving a request for the web page, by the server, sending the compiled object class to the client;
   wherein during run-time at the client no string parsing is involved when rendering the user interface item.

2. A computing device, comprising: a microprocessor; memory coupled to the microprocessor,
   the memory containing instructions, which when executed, cause the microprocessor to:
      receive, by a server, programming code in JavaScript for rendering the webpage;
      receive, by the server, a script object template for a user interface item from a universal script object library, the script object template comprising HTML code configured to render the user interface item;
      embed, by the server, the HTML code of the script object template into the programming code to form a combined code;
      convert, by the server, the combined code into a compiled object class in JavaScript, the converting comprising: converting the entire HTML code in the combined code into a rendering function, wherein the rendering function comprises JavaScript code configured to build a Document Object Model node for the user interface item during run-time at the client; and
      upon receiving a request for the web page, by the server, send the compiled object class to the client;
      wherein during run-time at the client no string parsing is involved when rendering the user interface item.

3. An article of manufacture comprising:
   a non-transitory computer readable storage medium, the storage medium containing instructions, which when executed, cause a microprocessor to:
   receive, by a server, programming code in JavaScript for rendering the webpage;
   receive, by the server, a script object template for a user interface item from a universal script object library, the script object template comprising HTML code configured to render the user interface item;
   embed, by the server, the HTML code of the script object template into the programming code to form a combined code;
   convert, by the server, the combined code into a compiled object class in JavaScript, the converting comprising: converting the entire HTML code in the combined code into a rendering function, wherein the rendering function comprises JavaScript code configured to build a Document Object Model node for the user interface item during run-time at the client; and
   upon receiving a request for the web page, by the server, send the compiled object class to the client;
   wherein during run-time at the client no string parsing is involved when rendering the user interface item.

* * * * *